Figure 1:
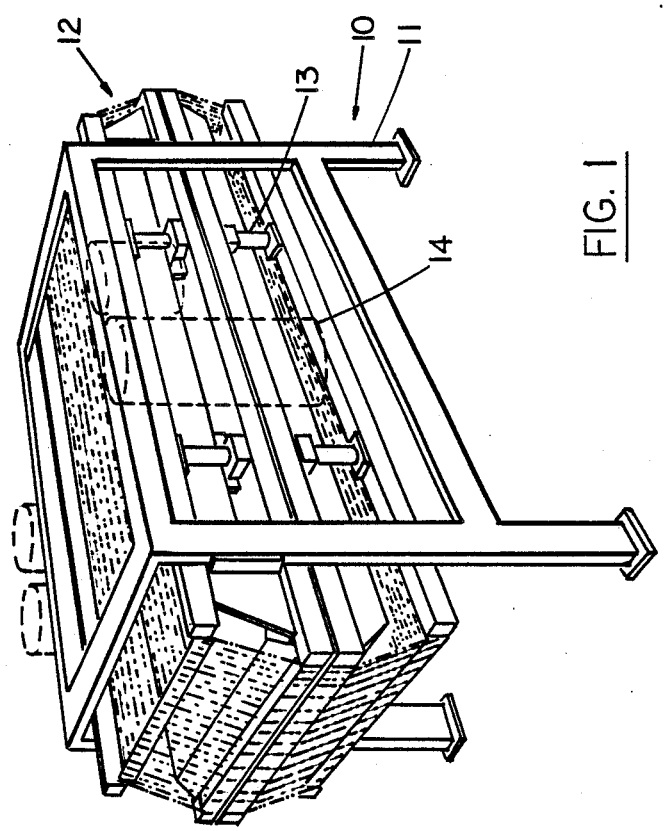

United States Patent [19]

Ranjith

[11] Patent Number: 4,921,717
[45] Date of Patent: May 1, 1990

[54] UHT CONCENTRATED MILK AND PRODUCT AND PROCESS OF MAKING

[75] Inventor: Heva M. P. Ranjith, Reading, England

[73] Assignee: Milk Marketing Board, Thames Ditton, United Kingdom

[21] Appl. No.: 138,387
[22] PCT Filed: May 11, 1987
[86] PCT No.: PCT/GB87/00316
    § 371 Date: Dec. 22, 1987
    § 102(e) Date: Dec. 22, 1987
[87] PCT Pub. No.: WO87/06797
    PCT Pub. Date: Nov. 19, 1987

[30] Foreign Application Priority Data

May 9, 1986 [GB] United Kingdom ............... 8611310

[51] Int. Cl.$^5$ ..................... A23C 1/12; A23L 3/34
[52] U.S. Cl. ..................... 426/587; 426/492; 426/522
[58] Field of Search ............... 426/587, 492, 522, 587

[56] References Cited

U.S. PATENT DOCUMENTS 2,860,057 11/1958 Wilcox ..................... 426/587

FOREIGN PATENT DOCUMENTS 968986 12/1950 France .
1308700 10/1962 France .
790972 2/1958 United Kingdom .

Primary Examiner—Donald E. Czaja
Assistant Examiner—Helen Pratt
Attorney, Agent, or Firm—Nixon & Vanderhye

[57] ABSTRACT

A process for producing a sterilized, concentrated milk product comprising the steps of
 (a) partially concentrating milk or a milk product,
 (b) sterilizing a partially concentrated milk product and
 (c) further concentrating the sterilized product of step (b) under sterile conditions.

19 Claims, 2 Drawing Sheets

UHT CONCENTRATED MILK AND PRODUCT AND PROCESS OF MAKING

The present invention relates to a sterilized concentrated milk product and to a new process for producing UHT sterilized concentrated milk products.

Sterilized concentrated milk is a dairy product with a worldwide market. It is particularly valued for its long keeping properties, especially in countries without indigent dairy industries where it is diluted for use in place of fresh milk. Due to its creamy taste, some individuals prefer to use sterilized concentrated milk in place of pouring cream. The conventional production processes involve either filling concentrated milk into containers and sterilizing by externally heating the containers or UHT sterilization of a concentrate which is then packed aseptically into containers. Both these production processes rely heavily on the use of stabilizers to prevent coagulation and deterioration of the product during the sterilization stages and in storage. Moreover, despite theoretical suggestions that it may be dispensed with, in practical terms a forewarming step is regarded as essential prior to concentration and UHT sterilization if problems of instability are to be avoided during the UHT treatment.

Whilst it is widely recognised that the UHT treated product is superior in terms of colour and flavour, the forewarming step is regarded as being economically disadvantageous because of the increased energy requirement of the process and is commercially unattractive as the long holding time involved makes it necessary to operate in a batch process rather than in a continuous manner. There are an increasing number of countries which insist that milk and milk products should be free from stabilizers and there is a general trend towards the avoidance of such materials wherever possible. However, it will be appreciated from the foregoing that the use of stabilizers is generally regarded as a pre-requisite for production of an acceptable sterilized concentrated milk product and the forewarming step is essential if UHT treatment is involved in the production process.

It has now, suprisingly, been found that the disadvantages of the prior art process can be avoided by use of a process in which milk or a milk product is partially concentrated, sterilized by UHT treatment and further concentrated to provide a sterile, concentrated material for aseptic packaging.

Accordingly, the present invention provides a process for producing a sterilized, concentrated milk product comprising the steps of (a) partially concentrating milk or a milk product,
(b) sterilizing a partially concentrated milk product and
(c) further concentrating the sterilized product of step (b) under sterile conditions.

The process of the present invention may be used for sterilizing and concentrating any milk or liquid milk product, hereinafter referred to as the "feed stock". The feed stock may be pasteurised or unpasteurised and is preferably fresh whole or skimmed milk, most preferably cow's milk.

In one embodiment of the present invention the process is conducted in a continuous manner, the feed stock flowing from storage facilities through each of steps (a), (b) and (c) in turn and then being packaged for distribution. In an alternative embodiment, the process may be interrupted after step (a), and the partially concentrated milk product in step (a) may, for instance, be transported to a different site before being subjected to steps (b) and (c). In this case it may be convenient to conduct step (a) to provide greater concentration of the feed stock than in the continuous process then to adjust the total solids and/or milk fat contents of the partially concentrated milk product before it is subjected to step (b) sterilization. Thus, for instance, cream or butter oil may be added to increase the milk fat content and or, especially when step (a) has provided a greater degree of concentration the milk product may be diluted to reduce the total solids content. This is particularly convenient where concentrated skimmed milk is transported to the site for sterilization and it is desired to produce a product having the character of concentrated sterilized whole milk.

Preferably the process is conducted in a continuous manner in which case step (a) suitably involves a reduction in volume to approximately half the volume of the initial feed stock. More preferably, step (a) involves concentrating raw milk or a milk product such that the partially concentrated milk product contains up to about 16% w/w of solids not fat (SNF), most preferably from 15 to 16% w/w SNF. In the case of concentrated whole milk the latter range corresponds with a total solids content of about 22 to 24% w/w whereas for concentrated skimmed milk the total solids content after step (a) would preferably be about 17 to 20% w/w. This concentration step may be effected using conventional milk concentrating apparatus under the usual operating conditions. When the process is to be interrupted after step (a) the feed stock may be concentrated to a much higher degree but will then be diluted and the fat content adjusted as necessary, to provide total solids and SNF contents described above prior to commencement of step (b).

Sterilization according to step (b) may be achieved by any conventional sterilization method, for instance by heating the partially concentrated milk product in bulk, or preferably, in a continuous flow process wherein the milk product is passed over one or more conventional heat exchangers, such as conventional indirect plate, coiled tube or scraped surface heat exchangers or by ohmic heating. Heating rates and holding times may be selected as convenient for the equipment in use but it is preferred that a HTST or, more preferably, UHT time-temperature regime is adopted. A particularly advantageous regime is to heat the milk product to UHT temperature in several stages for instance in three stages in which the first stage takes the temperature to approximately 60° C., the second stage raises the temperature to 85° to 90° C. with a holding time of up to a maximum of about 30 seconds, preferably about 15 seconds and the third stage takes the temperature to 140°–145° C. with a holding time of approximately 4 seconds. Other time-temperature regimes of similar bactericidal effect, such as that described in U.S. Pat. No. 4798731 may be used.

In step (c) the sterile milk product is further concentrated under sterile conditions, conveniently by evaporation under reduced pressure, for instance in a vaccum pan. Preferably, the further concentration is effected immediately after the UHT stage and also achieves substantial cooling of the milk product. Most preferably step (c) is achieved using an aseptic flash cooler, with a sterile vacuum chamber, such as would be used in a conventional direct UHT milk sterilization plant.

Step (c) is suitably conducted such that the complete process achieves a 2.5 to 3-fold concentration of the original feed stock. Preferably whole milk concentrated and sterilized according to the present invention has a total solids content of about 30 to 36% w/w corresponding with from about 20 to 25% SNF, whereas concentrated sterilized skimmed milk produced according to the invention preferably comprises from about 22 to 28% w/w total solids being almost entirely non-fat solids. The desired final concentration is achieved by adjusting the vaccum applied during step (c). Thus to produce concentrated sterilized whole milk of about 30% w/w total solids content, step (c) can conveniently be conducted under a vacuum of from about 10 to 12 in. mercury (i.e. at a pressure of from 67 to 61 $kNm^{-2}$) whereas for a 36% w/w total solids content the sterilized partially concentrated whole milk will be cooled and evaporated under a vacuum of from about 15 to 18 in. mercury (i.e. at a pressure of from 50 to 40 $kNm^{-2}$).

The sterile concentrate produced in step (c) is if necessary, further cooled and aseptically filled into containers, such as industrial bulk containers (1000 kg) catering packs of, for instance 5 to 20 litres or smaller, domestic packs (e.g. 200 ml to 1 litre).

Preferably the process of the present invention also comprises a homogenization step, suitably conducted using conventional high-pressure, two-stage homogenization plant. This step may be included at any convenient point in the process, for instance before the initial concentration step (a), between step (a) and step (b) or, preferably, after the final concentration step (c). In the latter case, in order to produce a sterile product, it is clearly necessary that the homogenization should be under aseptic conditions.

Without wishing to be bound by any theory it is believed that the process of the present invention enables sterilized concentrated milk to be produced without a forewarming step and without the addition of stabilizers because it avoids the unstable combination of highly concentrated milk at high temperature. Thus, for instance, it has been found that a whole milk concentrate having a total solids content above about 26% w/w is unstable above about 105° to 110° C. whereas slightly less concentrated milk can withstand UHT treatment. After the UHT treatment, by aseptic flash cooling the concentration increases as the temperature decreases such that the milk product is always below the critical combination of concentration and temperature at which it would become unstable. This process may offer advantages in improved energy efficiency in the concentration/sterilization plant and the organoleptic qualities of the milk product which may be realised even when the process includes a forewarming step and/or the addition of stabilizers.

The present invention also provides a concentrated, sterilized milk product substantially free of stabilizers in which a significant proportion of the whey proteins are in their native conformation. Preferably the product is concentrated, sterilized whole milk in which case the product has a total solids content of 30 to 36% w/w and preferably it is produced according to the process of the present invention.

The invention will now be described by way of Example, with reference to the drawings in which FIG. 1 shows, in diagramatic form, a plant for producing concentrated sterilized milk according to one embodiment of the process of the present invention.

EXAMPLE 1

Referring to FIG. 1 of the drawings, raw whole cow's milk containing 3.7% milk fat and 12.3% w/w total solids is drawn from balance tank (1) and is passed to an evaporator where the volume is reduced by one half and the concentration is increased to 23 to 24% w/w total solids by vacuum evaporation at 65° C. and under a 10 to 12 in. vacuum (i.e. at 67 to 61 $kNm^{-2}$ pressure). The partially concentrated milk is then pumped through preheater No. 1 bringing its temperature to about 60° C. and subsequently through preheater No. 2 where the temperature is increased to 85° to 90° C. Both preheaters are plate type heaters. The holding time in preheater No. 1 is not critical, the holding time in preheater No. 2 is typically 15 s. The milk is passed, at 85° to 90° C., to the indirect scraped surface UHT heater where the temperature of the milk is increased rapidly to 140°-145° C. with a holding time of 4 s and is immediately directed to an aseptic flash cooler or evaporator. By evaporation under a 15 to 16 in. vacuum (i.e. at 50 to 47 $kNm^{-2}$ pressure) the milk product is cooled to below 70° C. and the concentration is increased to about 36% w/w total solids. Still under aseptic conditions the sterilized concentrated milk stream is passed, at 60° to 70° C., to a 2-stage aseptic homogeniser, operating at 3000 psi and 500 psi (20.7 and 3.4 $MNm^{-2}$) respectively. The homogenized milk stream is then directed to an aseptic packaging station at which it is filled into sterile containers under sterile conditions and the containers are sealed.

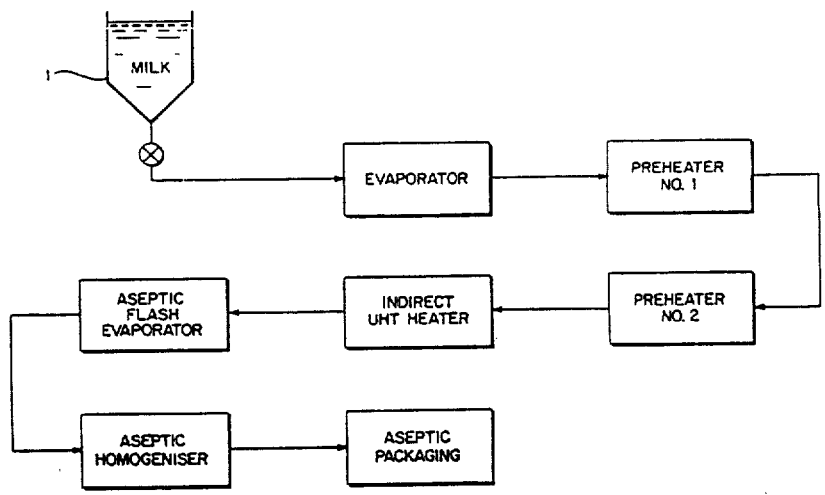

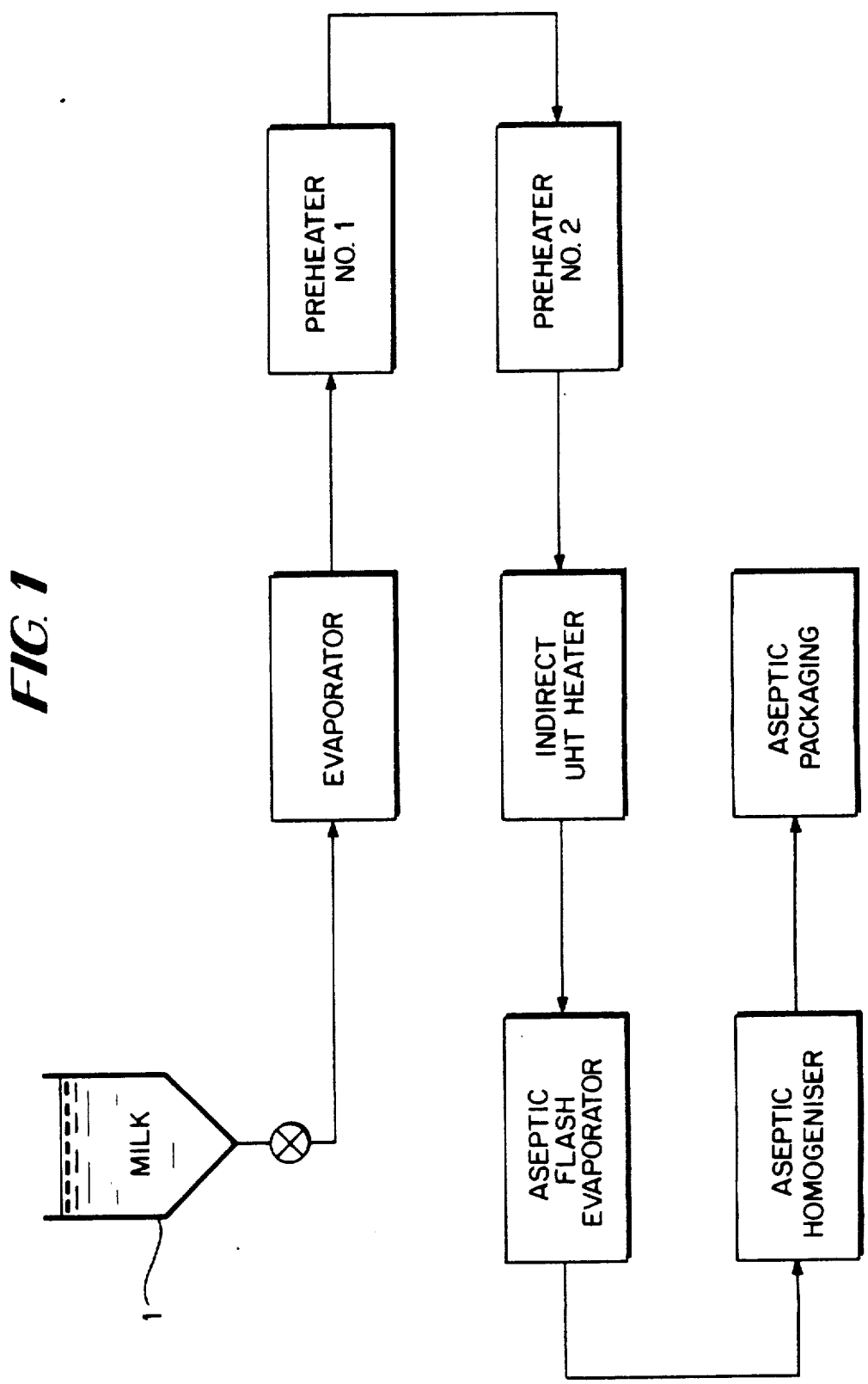

I claim:
1. A process for producing a sterilized, concentrated milk product consisting essentially of the steps of:
   (a) partially concentrating milk or a milk product to form a partially concentrated milk product containing up to about 16% w/w of solids not fat,
   (b) sterilizing said partially concentrated milk product by indirect or ohmic heating, and
   (c) further concentrating the sterilized product of step (b) under sterile conditions.
2. A process according to claim 1 wherein unpasteurized or pasturized milk is partially concentrated in step (a).
3. A process according to claim 2 wherein the milk is fresh whole cows milk or skimmed cows milk.
4. A process according to claim 1 wherein, after step (a) the total solids and/or milk fat content of the partially concentrated milk product is adjusted.
5. A process according to claim 4 wherein the concentration is adjusted by addition of butter oil or cream.
6. A process according to claim 1 wherein, in step (a), the volume of the initial feedstock is reduced by one half.
7. A process according to claim 1 wherein the partially concentrated milk product of step (a) contains from 15 to 16% w/w of solids not fat.
8. A process according to claim 1 wherein the partially concentrated milk product produced in step (a) is partially concentrated whole milk having a total solids content of from 22 to 24% w/w.
9. A process according to claim 1 wherein the partially concentrated milk product produced in step (a) is partially concentrated skimmed milk having a total solids content of from 17 to 20% w/w.
10. A process according to claim 1 wherein sterilization according to step (b) is according to a HTST or UHT time-temperature regime.

11. A process according to claim 1 wherein sterilization according to step (b) is conducted by heating a partially concentrated milk product in two stages to a temperature of 85° to 95° C. with a holding time of up to 30 seconds, then further heating the milk product to a temperature of from 140° to 145° C. with a holding time of 4 seconds.

12. A process according to claim 1 wherein the sterile milk product of step (b) is concentrated by evaporation under reduced pressure.

13. A process according to claim 1 wherein the sterile concentrated milk product produced in step (c) has been concentrated from 2.5 to 3-fold relative to the original feedstock.

14. A process according to claim 1 wherein the concentrated, sterilized milk product is concentrated, sterilized whole milk having a total solids content of from 30 to 36% w/w.

15. A process according to claim 1 wherein concentrated, sterilized milk product is concentrated, sterilized whole milk having a solids not fat content of from 20 to 25% w/w.

16. A process according to claim 1 wherein concentrated, sterilized milk product is concentrated, sterilized skimmed milk having a concentration of from 22 to 28% w/w total solids.

17. A concentrated, sterilized milk product substantially free of stabilizers in which a significant proportion of the whey proteins are in their native conformation.

18. A concentrated, sterilized whole milk product substantially free of stabilizers having a total solids content of from 30 to 36% w/w and having a significant proportion of the whey proteins in their native conformation.

19. A concentrated, sterilized milk product produced by the process of claim 1.

* * * * *

UNITED STATES PATENT AND TRADEMARK OFFICE
CERTIFICATE OF CORRECTION

PATENT NO.    :  4,921,717

DATED         :  May 1, 1990

INVENTOR(S) :  Heva M. P. Ranjith

Figure 2:
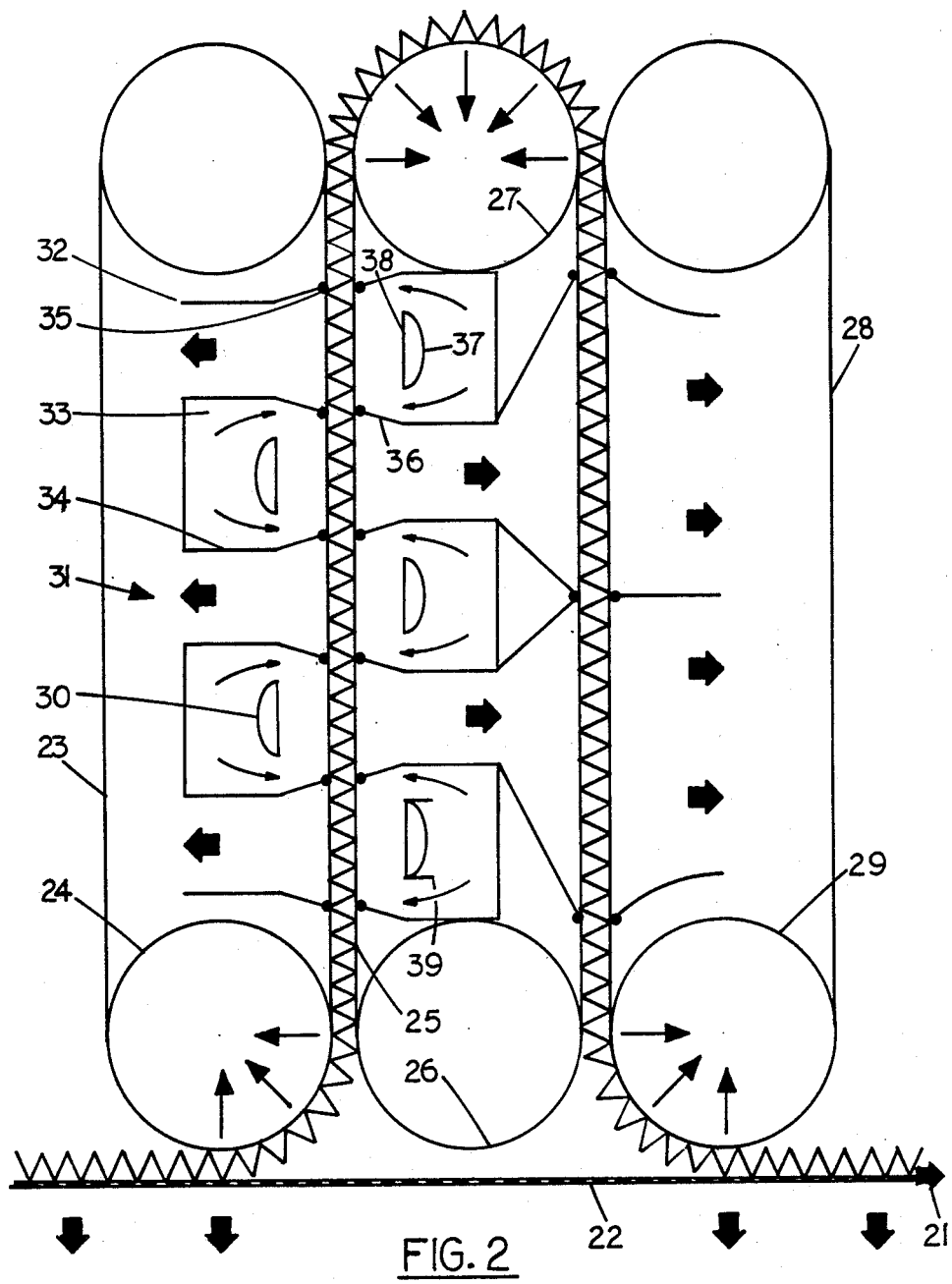

It is certified that error appears in the above-identified patent and that said Letters Patent is hereby corrected as shown below:

The title page, showing the illustrative figure, and the two Drawing Sheets, consisting of Figs. 1 and 2, should be deleted and substitute therefor the attached title page and the Drawing Sheet, consting of FIG. 1.

Signed and Sealed this

Sixteenth Day of June, 1992

Attest:

DOUGLAS B. COMER

*Attesting Officer*    Acting Commissioner of Patents and Trademarks

United States Patent [19]

Ranjith

[11] Patent Number: 4,921,717
[45] Date of Patent: May 1, 1990

[54] UHT CONCENTRATED MILK AND PRODUCT AND PROCESS OF MAKING

[75] Inventor: Heva M. P. Ranjith, Reading, England

[73] Assignee: Milk Marketing Board, Thames Ditton, United Kingdom

[21] Appl. No.: 138,387

[22] PCT Filed: May 11, 1987

[86] PCT No.: PCT/GB87/00316
§ 371 Date: Dec. 22, 1987
§ 102(e) Date: Dec. 22, 1987

[87] PCT Pub. No.: WO87/06797
PCT Pub. Date: Nov. 19, 1987

[30] Foreign Application Priority Data

May 9, 1986 [GB] United Kingdom ............... 8611310

[51] Int. Cl.⁵ ........................... A23C 1/12; A23L 3/34
[52] U.S. Cl. ........................... 426/587; 426/492; 426/522
[58] Field of Search ............... 426/587, 492, 522, 587

[56] References Cited

U.S. PATENT DOCUMENTS 2,860,057 11/1958 Wilcox ..................... 426/587

FOREIGN PATENT DOCUMENTS 968986 12/1950 France .
1308700 10/1962 France .
790972 2/1958 United Kingdom .

Primary Examiner—Donald E. Czaja
Assistant Examiner—Helen Pratt
Attorney, Agent, or Firm—Nixon & Vanderhye

[57] ABSTRACT

A process for producing a sterilized, concentrated milk product comprising the steps of
(a) partially concentrating milk or a milk product,
(b) sterilizing a partially concentrated milk product and
(c) further concentrating the sterilized product of step (b) under sterile conditions.

19 Claims, 2 Drawing Sheets